US006848024B1

(12) United States Patent
Rowlands et al.

(10) Patent No.: US 6,848,024 B1
(45) Date of Patent: Jan. 25, 2005

(54) PROGRAMMABLY DISABLING ONE OR MORE CACHE ENTRIES

(75) Inventors: Joseph B. Rowlands, Santa Clara, CA (US); James B. Keller, Palo Alto, CA (US)

(73) Assignee: Broadcom Corporation, Irvine, CA (US)

(*) Notice: Subject to any disclaimer, the term of this patent is extended or adjusted under 35 U.S.C. 154(b) by 393 days.

(21) Appl. No.: 09/633,683

(22) Filed: Aug. 7, 2000

(51) Int. Cl.[7] .............................................. G06F 12/00
(52) U.S. Cl. ..................... 711/128; 711/118; 711/123; 711/135; 711/144; 711/145
(58) Field of Search ................... 711/128, 117–118, 711/123, 144–145, 135, 121, 141, 3, 125, 129, 134, 136, 202, 206, 122

(56) References Cited

U.S. PATENT DOCUMENTS

| 3,693,165 A | 9/1972 | Reiley et al. |
| 4,044,338 A | 8/1977 | Wolf |

(List continued on next page.)

FOREIGN PATENT DOCUMENTS

| EP | 0 061 570 | 10/1982 |
| EP | 0 259 095 | 3/1988 |
| EP | 325 420 | 7/1989 |
| EP | 0 381 471 | 8/1990 |
| EP | 0 436 092 | 7/1991 |
| EP | 0 459 232 | 12/1991 |
| EP | 0 459 233 | 12/1991 |
| EP | 0 569 221 | 11/1993 |
| EP | 0 687 979 | 12/1995 |
| EP | 997 821 | 5/2000 |
| EP | 03010901.1 | 9/2003 |
| GB | 2 214 336 | 8/1989 |
| GB | 2 263 985 | 8/1993 |
| GB | 2 263 987 | 8/1993 |
| GB | 2 281 422 | 3/1995 |

OTHER PUBLICATIONS

Halfhill et al., "SiByte Reveals 64–bit Core for NPUs," Microprocessor Report, Jun. 2000, pp. 45–48.
Intel® StrongARM® SA–1100 Microprocessor, Developer's Manual, Aug. 1999, © Intel Corporation, Ch. 1, p. 6; Ch.2, p. 2; Ch. 6, pp. 2–5; Ch. 7, p. 3.
Cyrix® 5×86 Microprocessor, Jul. 1995, 8 pgs.
Cyrix® 6×86 Microprocessor, Aug. 1995, 6 pgs.
"Memory Arbitration with Out of Order Execution in Conjunction with a RISC System," IBM Technical Disclosure Bulletin, Sep. 1992, pp. 62–64.
"Handling Reservations in Multiple–Level Cache," IBM Technical Disclosure Bulletin, Dec. 1993, pp. 441–446.
Dekker et al., "A Realistic Fault Model and Test Algorithms for Static Random Access Memories," IEEE Transactions on Computer–Aided Design, vol. 9, No. 6, Jun. 1990, pp. 567–572.

(List continued on next page.)

*Primary Examiner*—Matthew Kim
*Assistant Examiner*—Zhuo H. Li
(74) *Attorney, Agent, or Firm*—Lawrence J. Merkel (57) ABSTRACT

A cache may be programmed to disable one or more entries from allocation for storing memory data (e.g. in response to a memory transaction which misses the cache). Furthermore, the cache may be programmed to select which entries of the cache are disabled from allocation. Since the disabled entries are not allocated to store memory data, the data stored in the entries at the time the cache is programmed to disable the entries may remain in the cache. In one specific implementation, the cache also provides for direct access to entries in response to direct access transactions.

55 Claims, 8 Drawing Sheets

U.S. PATENT DOCUMENTS

| | | | |
|---|---|---|---|
| 4,453,212 | A | 6/1984 | Gaither et al. |
| 4,511,994 | A | 4/1985 | Webb et al. |
| 4,575,792 | A | 3/1986 | Keeley |
| 4,633,440 | A | 12/1986 | Pakulski |
| 4,654,778 | A | 3/1987 | Chiesa et al. |
| 4,807,115 | A | 2/1989 | Torng |
| 4,833,642 | A | 5/1989 | Ooi |
| 4,858,105 | A | 8/1989 | Kuriyama et al. |
| 4,907,278 | A | 3/1990 | Cecinati et al. |
| 4,996,641 | A | 2/1991 | Talgam et al. |
| 5,113,514 | A | 5/1992 | Albonesi et al. |
| 5,125,083 | A | 6/1992 | Fite et al. |
| 5,163,142 | A | 11/1992 | Mageau |
| 5,193,163 | A | 3/1993 | Sanders et al. |
| 5,226,126 | A | 7/1993 | McFarland et al. |
| 5,226,130 | A | 7/1993 | Favor et al. |
| 5,241,663 | A | 8/1993 | Rohwer |
| 5,303,362 | A | 4/1994 | Butts, Jr. et al. |
| 5,317,716 | A | 5/1994 | Liu |
| 5,325,504 | A | 6/1994 | Tipley et al. |
| 5,353,425 | A | 10/1994 | Malamy et al. |
| 5,369,753 | A | 11/1994 | Tipley |
| 5,377,345 | A | 12/1994 | Chang et al. |
| 5,410,669 | A * | 4/1995 | Biggs et al. ................. 711/118 |
| 5,414,827 | A * | 5/1995 | Lin ............................ 711/135 |
| 5,416,783 | A | 5/1995 | Broseghini et al. |
| 5,432,918 | A | 7/1995 | Stamm |
| 5,450,551 | A | 9/1995 | Amini et al. |
| 5,471,598 | A | 11/1995 | Quattromani et al. |
| 5,487,162 | A | 1/1996 | Tanaka et al. |
| 5,493,667 | A | 2/1996 | Huck et al. |
| 5,510,934 | A | 4/1996 | Brennan et al. |
| 5,526,510 | A | 6/1996 | Akkary et al. |
| 5,539,878 | A | 7/1996 | Kikinis |
| 5,551,001 | A | 8/1996 | Cohen et al. |
| 5,557,763 | A | 9/1996 | Senter et al. |
| 5,564,034 | A | 10/1996 | Miyake |
| 5,584,014 | A | 12/1996 | Nayfeh et al. |
| 5,586,253 | A | 12/1996 | Green et al. |
| 5,586,293 | A | 12/1996 | Baron et al. |
| 5,588,126 | A | 12/1996 | Abramson et al. |
| 5,592,679 | A | 1/1997 | Yung |
| 5,638,537 | A | 6/1997 | Yamada et al. |
| 5,644,752 | A | 7/1997 | Cohen et al. |
| 5,668,815 | A | 9/1997 | Gittinger et al. |
| 5,668,972 | A | 9/1997 | Liu et al. |
| 5,671,444 | A * | 9/1997 | Akkary et al. ................. 710/52 |
| 5,748,640 | A | 5/1998 | Jiang et al. |
| 5,752,261 | A | 5/1998 | Cochcroft, Jr. |
| 5,761,712 | A | 6/1998 | Tran et al. |
| 5,768,555 | A | 6/1998 | Tran et al. |
| 5,784,588 | A | 7/1998 | Leung |
| 5,787,490 | A | 7/1998 | Ozawa |
| 5,802,338 | A | 9/1998 | Rechtschaffen et al. |
| 5,809,528 | A | 9/1998 | Miller et al. |
| 5,809,531 | A | 9/1998 | Brabandt |
| 5,875,465 | A | 2/1999 | Kilpatrick et al. |
| 5,897,651 | A * | 4/1999 | Cheong et al. ................. 711/3 |
| 5,913,224 | A | 6/1999 | MacDonald |
| 5,974,507 | A | 10/1999 | Arimilli et al. |
| 5,974,508 | A * | 10/1999 | Maheshwari ................ 711/133 |
| 5,983,321 | A * | 11/1999 | Tran et al. ................... 711/125 |
| 6,026,461 | A | 2/2000 | Baxter et al. |
| 6,115,792 | A | 9/2000 | Tran |
| 6,148,370 | A | 11/2000 | Kobayashi |
| 6,161,167 | A | 12/2000 | Witt |
| 6,185,657 | B1 * | 2/2001 | Moyer ........................ 711/128 |
| 6,185,703 | B1 | 2/2001 | Guddat et al. |
| 6,223,256 | B1 * | 4/2001 | Gaither ....................... 711/134 |
| 6,237,083 | B1 | 5/2001 | Favor |
| 6,240,432 | B1 | 5/2001 | Chuang et al. |
| 6,240,532 | B1 | 5/2001 | Cho |
| 6,263,082 | B1 | 7/2001 | Ishimoto et al. |
| 6,269,427 | B1 * | 7/2001 | Kuttanna et al. ............ 711/140 |
| 6,279,083 | B1 * | 8/2001 | MacDonald ................ 711/138 |
| 6,295,608 | B1 * | 9/2001 | Parkes et al. .................. 714/1 |
| 6,351,789 | B1 | 2/2002 | Green |
| 6,405,287 | B1 | 6/2002 | Lesartre |
| 6,430,655 | B1 * | 8/2002 | Courtright et al. ........... 711/118 |
| 6,434,671 | B2 * | 8/2002 | Chung ........................ 711/129 |
| 6,591,347 | B2 * | 7/2003 | Tischler et al. ............. 711/134 |

OTHER PUBLICATIONS

Stepanian, SiByte, Sibyte SB–1 MIPS64 CPU Core, Embedded Processor Forum 2000, Jun. 13, 2000, 15 pages.

Gallup, et al., "Testability Features of the 68040," Motorola, Inc., 1990 International Test Conference, IEEE, pp. 749–757.

Hollenbeck, et al., "PA7300LC Integrates Cache for Cost/Performance," Hewlett Packard Company, IEEE, 1996, pp. 167–174.

International Search Report for EP 26 217–50, mailed Mar. 10, 2003, 4 pages.

* cited by examiner

PROGRAMMABLY DISABLING ONE OR MORE CACHE ENTRIES

BACKGROUND OF THE INVENTION

1. Field of the Invention

This invention is related to the field of caching and, more particularly, to mechanisms for disabling a portion of a cache.

2. Description of the Related Art

Processors typically provide a set of registers which may be used by programs as a high speed, private storage for operands. The operands stored in registers may be frequently accessed variables, or may be intermediate results in a complex, multi-instruction calculation. Unfortunately, for many tasks, the number of registers provided in the processor may be too few to hold all of the operands of interest. In such cases, many of the frequently accessed variables and/or intermediate results are written to and read from memory locations during execution of the program.

The memory may have a significantly higher latency than the registers, limiting the speed at which the program may be executed as compared to the speed that may be achieved if all operands were in registers. Processors and/or the computer systems including the processors may provide caches to alleviate the memory latency. Generally, a cache is a relatively small, high speed memory which may store copies of data corresponding to various recently accessed memory locations. Generally, cache storage is allocated and deallocated in units of cache lines (a group of bytes from contiguous memory locations). In other words, the cache may include multiple entries, and each entry may include storage for a cache line of bytes. If requested data for an access is not in the cache (a "miss"), an entry is allocated for the cache line including the requested data and the cache line is filled into the allocated entry. In some cases, a portion of the cache line (often called a "sector") may be valid while other portions are invalid. However, the entire cache entry is allocated for the cache line if one or more of the sectors are valid.

While caches may reduce the average latency for memory accesses, the latency for any particular access is generally not deterministic. If the requested data is stored in the cache (a "hit"), then the latency is low. If the requested data is a miss in the cache, on the other hand, then the latency is high. Accesses may miss the cache for a variety of reasons. For example, an access misses the cache if the cache line including the requested data has not been accessed before. A current access may miss even if the cache line has been previously accessed, if other cache lines which map to the same entry (or set of entries, depending on the cache structure) are accessed in the interval between the previous access and the current access. In multi-master coherent environments, coherency activity due to accesses by other masters may cause cache lines to be invalidated in the cache. These various causes of cache misses may be hard to predict, and thus managing the cache to provide deterministic, low latency access to certain operands may be difficult to achieve. Accordingly, a mechanism for providing deterministic, low latency access to operands is desired.

SUMMARY OF THE INVENTION

The problems outlined above are in large part solved by a cache in accordance with the present disclosure. The cache may be programmed to disable one or more entries from allocation for storing memory data (e.g. in response to a memory transaction which misses the cache). Furthermore, the cache may be programmed to select which entries of the cache are disabled from allocation. Since the disabled entries are not allocated to store memory data, the data stored in the entries at the time the cache is programmed to disable the entries may remain in the cache. The programmable disable of entries may have a variety of uses.

For example, in one embodiment, the disabled entries may be used as a private scratch pad memory. In one specific implementation, the cache also provides for direct access to entries in response to direct access transactions. Thus, the cache may provide a private scratch pad memory by disabling the one or more entries and using the direct access transactions to directly access the disabled entries for scratch pad reads and writes. Since the entries are disabled for use in the fill and eviction of memory data, these activities may not affect the storage of scratch pad data in the disabled entries. In one embodiment, the direct access transactions are specified via a direct access address space separate from the memory address space. Thus, coherency activity in the memory space may not affect the data in the direct access address space. Scratch pad (direct access) read and write transactions may experience a deterministic, low latency (the latency of a cache hit). For example, operands which are frequently accessed and/or intermediate results may be stored in the scratch pad memory.

Additionally, since the disabling of entries is programmable, the size of the scratch pad memory may be varied to suit the performance needs of the programs being executed. If no scratch pad memory is needed, the entire cache may be used to cache memory data. If scratch pad memory is needed, the number of entries may be selected to provide enough scratch pad memory while leaving the remainder of the cache available to cache memory data. In one implementation, the cache is set associative and one or more ways of the cache may be disabled. Accordingly, a way in which a manufacturing defect is detected may be disabled, and the remaining ways may still be used to store memory data. However, if the defect affects only some of the entries within the disabled way, the remaining entries may be used as scratch pad memory.

While the programmable disable of entries may be used for scratch pad operations, other uses are contemplated as well. For example, the programmable disable of entries may be used for testing associative embodiments. Each of the entries which may be eligible to store data for a given transaction may be disabled except for one entry to be tested. The given transaction may be performed, loading test data into the test entry. The test data may then be read to ensure that the test entry is functioning properly.

Furthermore, the programmable disable of entries may be used to lock memory data into the cache. For example, only the entries which are to be locked may be enabled, memory transactions accessing the data to be locked into the cache may be performed (causing the data to be loaded into the entries, assuming the data misses in the cache), then the entries may be disabled (and other entries enabled). Since the entries are disabled from allocation in response to subsequent cache misses, the data may be locked into the disabled entries. Memory reads and writes to the data may be detected as hits in the cache.

Broadly speaking, a cache is contemplated. The cache includes a memory and a control circuit coupled to the memory. The memory has a plurality of entries, each of the plurality of entries being capable of storing a cache line of data. The control circuit is programmably configurable to disable allocation of one or more entries of the plurality of entries for storing data corresponding to memory transactions. The one or more entries are programmably selectable from the plurality of entries.

Additionally, a system is contemplated comprising a processor, a memory controller, and a cache. The processor is configured to initiate transactions. Coupled to receive the transactions, the memory controller is capable of being coupled to a memory. The cache, also coupled to receive the transactions, includes a plurality of entries. Each of the plurality of entries is capable of storing a cache line of data. The cache is programmably configurable to disable allocation of one or more entries of the plurality of entries to store data corresponding to the transactions which target a location within the memory. The one or more entries are programmably selectable from the plurality of entries.

Moreover, a method is contemplated. One or more entries in a cache are programmably disabled from allocation to store data corresponding to memory transactions. The one or more entries are programmably selectable from a plurality of entries in the cache.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
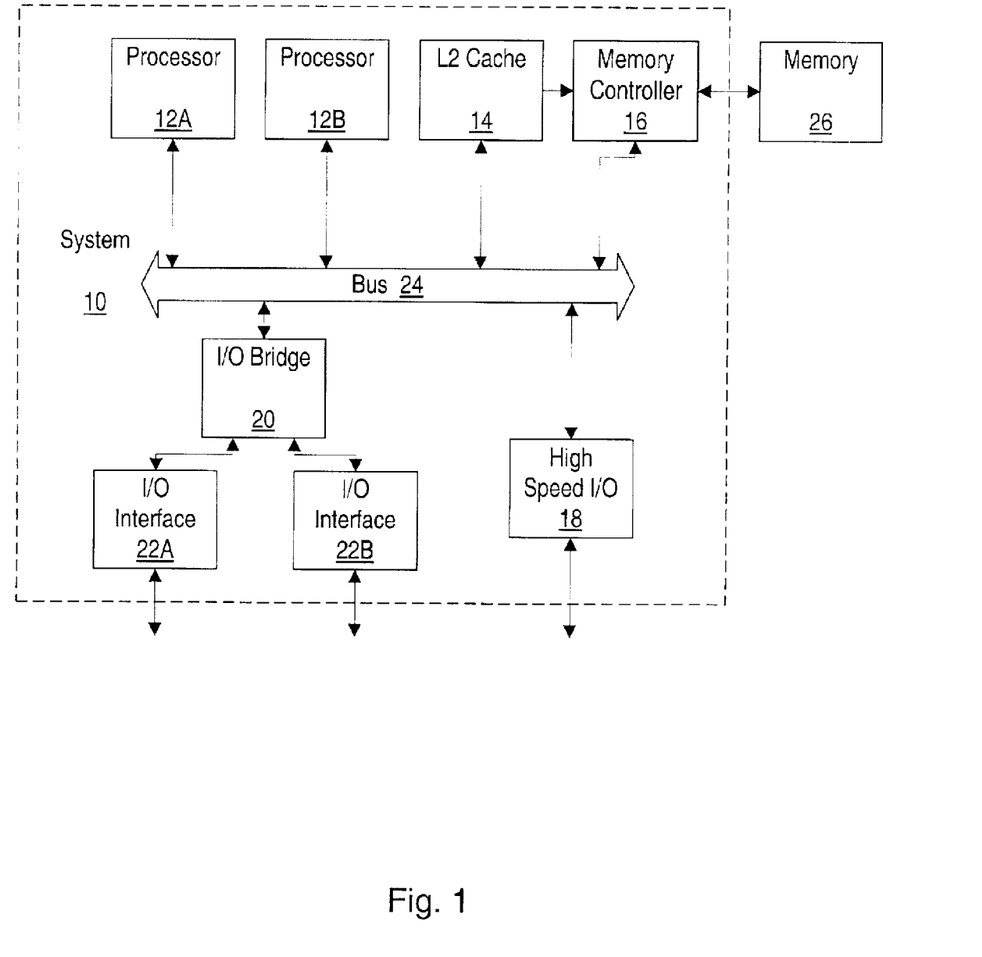
FIG. 1 is a block diagram of one embodiment of a system including a cache.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) interface 18, an I/O bridge 20, and I/O interfaces 22A–22B. System 10 may include a bus 24 for interconnecting the various components of system 10. As illustrated in FIG. 1, each of processors 12A–12B, L2 cache 14, memory controller 16, high speed I/O interface 18 and I/O bridge 20 are coupled to bus 24. I/O bridge 20 is coupled to I/O interfaces 22A–22B. L2 cache 14 is coupled to memory controller 16, which is further coupled to a memory 26.

Generally, L2 cache 14 may support the programmable disabling of one or more entries from allocation in response to memory transactions which miss L2 cache 14. Furthermore, L2 cache 14 may support the selection of which of the cache entries are disabled. For example, L2 cache 14 may be set associative and may support the disabling of one or more ways of the cache. Alternatively, L2 cache 14 may support disabling of one or more indexes of one or more ways of the cache. L2 cache 14 may include one or more registers, accessible via a configuration transaction, which may be programmed with information indicating which entries of L2 cache 14 are disabled from allocation in response to memory transactions.

The disabled entries may be used as a scratch pad memory by processors 12A–12B. A scratch pad memory is a private memory used by the processors, similar to the fashion in which registers operate. For example, in an embodiment in which one or more of the ways may be disabled, a scratch pad may be established by disabling the one or more ways (and enabling the remaining ways). Since the selected ways are disabled (and thus the data stored therein may not be dislodged due to allocation of entries for memory transactions which miss), the scratch pad data may be unaffected by normal cache replacement activities. Thus, the scratch pad data may remain stored in L2 cache 14 even as other data is filled into and evicted from the remaining ways. Direct access transactions, described below, may be used to access the scratch pad data.

Additionally, since the entries which are disabled are programmable, the size of the scratch pad memory may be varied to suit the performance needs of the programs being executed. If no scratch pad memory is needed, the entire L2 cache 14 may be used to cache memory data. If scratch pad memory is needed, the number of entries may be selected to provide enough scratch pad memory while leaving the remainder of the L2 cache 14 available to cache memory data.

The programmable disable of selected entries in the cache may have a variety of uses in addition to the scratch pad use described above. For example, the programmable disable may be used to facilitate testing. To test a particular entry, other entries which could be allocated for data corresponding to a test transaction may be disabled. The test transaction may be performed, and the data is stored into the particular entry. The test data may then be read to ensure it was stored in the correct entry. The other entries could be tested in a similar manner. As another example, the programmable disable may be used for general locking of data into L2 cache 14 to provide fairly deterministic, low latency access to certain memory data locked into the L2 cache.

Processors 12A–12B and/or the I/O bridges/interfaces may initiate transactions on the bus 24. Transactions may include read transactions (transfers of data to the transaction initiator) and write transactions (transfers of data from the transaction initiator). Transactions may further include various coherency commands (e.g. an invalidate command) which may or may not involve a transfer of data.

System 10 supports various types of transactions on bus 24. Memory transactions are transactions which target a memory location. Additionally, system 10 may support direct access transactions to L2 cache 14. As used herein, the term "direct access transaction" refers to a transaction which targets an entry in L2 cache 14 and explicitly specifies that entry. If the direct access transaction is a read, the data in the specified entry is returned by L2 cache 14. If the direct access transaction is a write, the data provided in the write transaction is stored in the entry. System 10 may further support I/O transactions and configuration transactions on bus 24.

An addressable range of system 10 is defined by the size of the addresses which may be transmitted on bus 24. The addressable range may be divided into several address spaces including a memory address space, a direct access address space, an I/O address space, and various configuration address spaces. In this embodiment, the address space which includes the address of a transaction may identify the type of the transaction. Thus, an address within the memory address space indicates that the transaction is a memory transaction and the address identifies a targeted memory location in memory 26 (and thus memory controller 16 and L2 cache 14 may respond to the transaction). An address within the I/O memory mapped address space indicates that the transaction is an I/O transaction and the address targets an I/O device on one of the I/O interfaces. An address within the configuration address space indicates that the transaction is a configuration transaction and the address targets various configuration registers in devices within system 10.

An address within the direct access address space indicates that the transaction is a direct access transaction and the address specifies the entry of L2 cache 14 to be directly accessed by the direct access transaction. For memory transactions, the entry (if any) of L2 cache 14 accessed to store or return data for the memory transaction is determined by comparing the tags of cache lines stored in the entry to the address of the memory transaction. On the other hand, direct access transactions explicitly specify the entry to be accessed. L2 cache 14 may access the specified entry without regard to the tag comparisons normally used to select the accessed entry.

While the above description uses address spaces to determine transaction type, other embodiments may determine transaction type in other ways. For example, command type encodings could be provided on control signals transmitted during the address portion of the transaction.

In one embodiment, direct access transactions may be used to access the disabled entries in L2 cache 14. Thus, in an embodiment for using a portion of L2 cache 14 as a scratch pad, the scratch pad may be established by disabling the one or more entries to be used as a scratch pad. Processors 12A–12B may perform direct access transactions to read and write scratch pad entries (including initializing the scratch pad with data, if desired). Since the normal process of filling memory transaction data into cache lines of L2 cache 14 does not affect the disabled entries, the scratch pad data is not evicted from L2 cache 14. Furthermore, since the direct access transactions are not in the memory address space, coherency activity in the memory address space does not affect the transactions (nor the data stored in the scratch pad entries, if they were written using direct access transactions). Accordingly, a deterministic latency (the latency of an L2 cache hit) may be achieved for scratch pad accesses.

It is noted that the programmable disable of cache ways may be used to disable a way or ways that have a manufacturing defect. In this manner, failure due to data corruption in the defective entries may be avoided while still permitting use of the non-defective ways. However, the defect may affect only some of the entries within the disabled way. Accordingly, functional entries within the disabled way may be used as scratch pad memory. More efficient use of the non-defective entries may thereby be achieved.

The scratch pad memory may be initialized in any desired fashion. For example, the random data that may be in the scratch pad memory when the entries are disabled may be used. In another alternative, direct access write transactions may be used to initialize the scratch pad memory locations.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O interface 18 may be an interface to a high speed I/O interconnect. For example, high speed I/O interface 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. I/O bridge 20 may serve to reduce the electrical loading on bus 24 if more than one I/O interface 22A–22B is bridged by I/O bridge 20. Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

Bus 24 may have any suitable protocol and construction. According to one implementation, bus 24 may be a split transaction bus. The implementation may include an address bus supporting up to 40 bits of addressable range and a data bus capable of transmitting one cache line per clock cycle (e.g. 32 bytes). Other widths for either the address bus or data bus are possible and contemplated. The bus may also include transactions to support maintaining memory coherency (e.g. an invalidate command). The bus may use any suitable signalling technique (e.g. differential or non differential signalling).

It is noted that system 10 (and more particularly processors 12A–12B, L2 cache 14, memory controller 16, I/O interfaces 18 and 22A–22B, I/O bridge 20, and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device.

Figure 2:
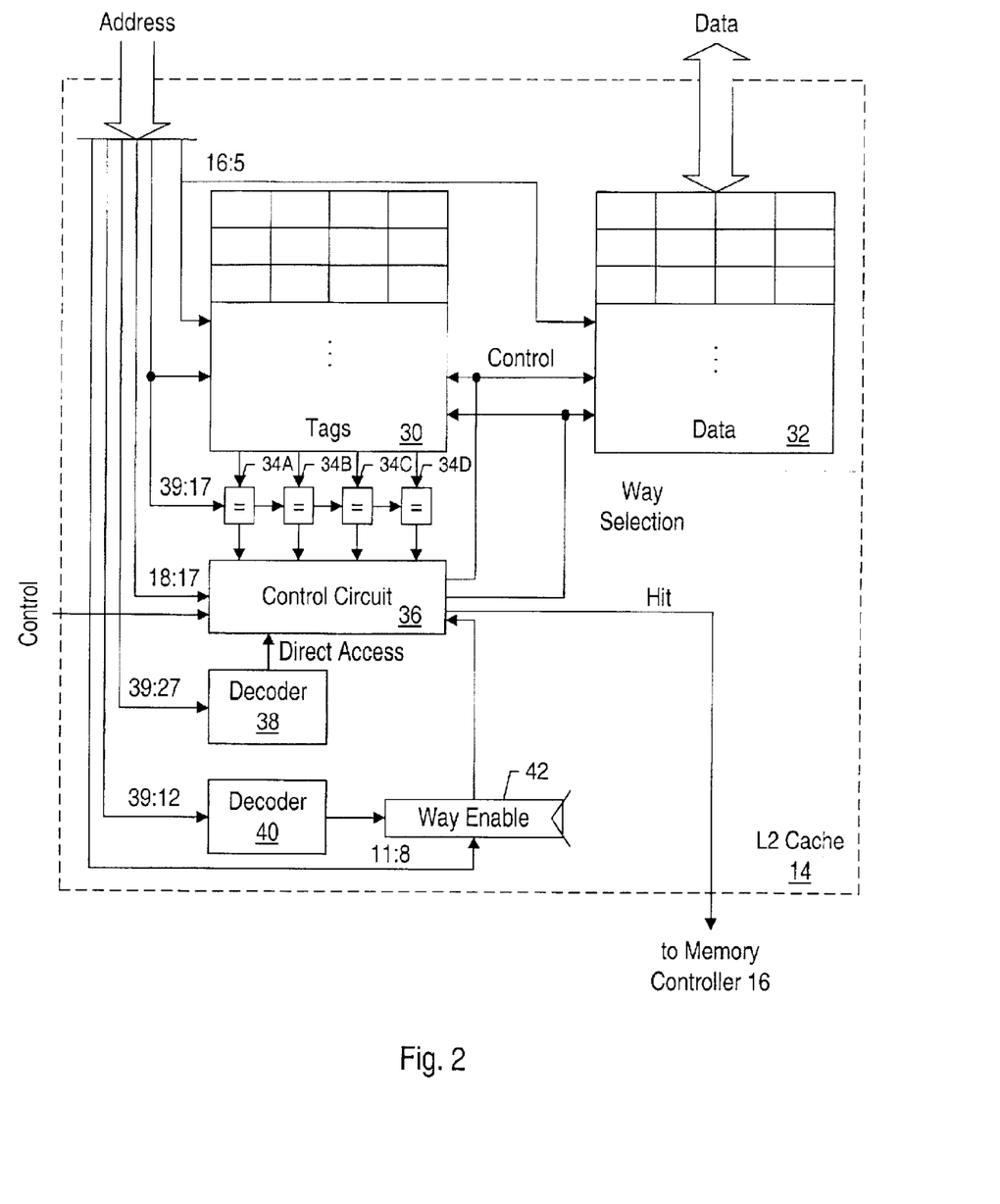
FIG. 2 is a block diagram of one embodiment of the cache shown in FIG. 1.

Turning now to FIG. 2, a block diagram of one embodiment of L2 cache 14 is shown. Other embodiments are possible and contemplated. In the embodiment of FIG. 2, L2 cache 14 includes a tags memory 30, a data memory 32, a set of comparators 34A–34D, a control circuit 36, a pair of decoders 38 and 40, and a way enable register 42. Tags memory 30 and data memory 32 are each coupled to receive an index portion of the address of a transaction (the address of the transaction may be referred to herein as the "input address"). Data memory 32 is coupled to receive and provide data corresponding to the transaction. Tags memory 30 is further coupled to receive a tag portion of the input address, and is coupled to comparators 34A–34D. Comparators 34A–34D are further coupled to receive the tag portion of the input address and are coupled to control circuit 36. Control circuit 36 is coupled to receive a portion of the input address, control information corresponding to a transaction, and a direct access signal from decoder 38. Control circuit 36 is coupled to provide a way selection and control signals to tags memory 30 and data memory 32, and is coupled to provide a hit signal to memory controller 16. Control circuit 36 is still further coupled to way enable register 42, which is coupled to receive a portion of the input address and is further coupled to decoder 40. Decoder 40 is coupled to receive a portion of the input address.

Generally, tags memory 30 stores the tag information for each entry in L2 cache 14, and data memory 32 stores the cache line of data for each entry in L2 cache 14. Thus, an entry comprises a tag memory storage location and a data memory storage location. The tag memory storage location stores the tag for the entry (and possibly other information, such as validity and dirty information). For example, in one implementation, a tag for an entry includes the tag portion of the address (e.g. bits 39:17 in the illustrated embodiment), a valid bit indicating the validity or lack of validity of the entry, and a dirty bit indicating the dirty or clean state of the cache line. A cache line is dirty if at least one byte of the cache line has been modified in L2 cache 14 and the modification has not been written to memory 26. The data memory storage location stores the cache line of data in the entry.

During memory transactions, the index portion of the input address (e.g. bits 16:5 in the illustrated embodiment) is provided to tags memory 30 and data memory 32. Each memory selects a set of storage locations in response to the index. Tags memory 30 outputs the tag from each selected storage location to comparators 34A–34D, which compare the tags to the tag portion of the input address. If the tag compares equally, and the entry is valid, the corresponding comparator 34A–34D may signal a hit to control circuit 36. Control circuit 36 may assert the hit signal to memory controller 16 if any of the comparators 34A–34D indicates a hit, and may determine a way selection from the output of comparators 34A–34D as well. Each comparator 34A–34D is comparing the tag from a different way of L2 cache 14, and thus the comparator output indicating a hit is an indication of the hitting way. Control circuit 36 provides the way selection to tags memory 30 and data memory 32.

Data memory 32 provides data from the storage location at the selected index and way, or receives data into that storage location, depending upon whether the memory transaction is a read or write transaction. Control circuit 36 receives the control information corresponding to the transaction, and generates control signals for data memory 32 and tags memory 30. The control signals may include, for example, an enable signal and a read/write signal to indicate whether the memory is to read or write.

Tags memory 30 may be updated in response to the transaction as well. For example, if the transaction is a write, the dirty bit in the hitting entry may be updated. Additionally, if the transaction is a miss in L2 cache 14 and is cacheable, L2 cache 14 may select a way for eviction to receive a line fill of the missing line. The evicted way may be provided as the way selection, and the valid bit in the evicted entry may be cleared to invalidate the cache line. The cache line may also be provided from data memory 32 for writing to memory 26 if the cache line is dirty. It is noted that tag updates and evictions may not occur in the same clock cycle that L2 cache 14 is accessed to determine the hit/miss of the input address, in some embodiments.

Way enable register 42 stores an indication of which ways are enabled for allocation for memory transactions and which ways are disabled. Thus, when control circuit 36 is selecting a way for eviction in response to a cache miss, the disabled ways are not selected. In this manner, the data in the disabled ways is not evicted, and the entries in the disabled ways are not allocated to store data corresponding to the memory transactions which miss. The disabled ways may be accessed using memory transactions which hit the data in the disabled ways or using direct access transactions, depending on the embodiment. Direct access transactions are described in more detail below.

L2 cache 14 may employ any eviction/replacement strategy. For example, if the least-recently used (LRU) strategy is used, the disabled ways in each set may be prevented from being marked as least recently used (e.g. they may be forced to most recently used). Thus, an enabled way is always marked as least recently used and is selected for eviction. If a random replacement strategy is used, the random selector may be managed so as not to generate the disabled ways. For example, if a counter is used, the counter may be incremented after each access or each replacement. The counter may be modified to skip the disabled ways when being incremented. More elaborate random generators (e.g. a linear feed back shift register, or LFSR) may similarly be prevented from generating a way selection for the disabled ways.

During direct access transactions, control circuit 36 receives an assertion of the direct access signal from decoder 38. Decoder 38 decodes the address of the transaction to detect that the address is in the direct access address space, and asserts the direct access signal if the address is in the direct access address space. For example, in the illustrated embodiment, the direct access address space may be the addresses having a predetermined combination of address bits 39:27. In one particular implementation, the combination of bits 39:27 may be (in hexadecimal) 00D and bit 27 may be 0. It is noted that the address space may be made smaller by including more of the most significant address bits to decoder 38 (e.g. additional bits below bit position 27) or larger by decoding fewer bits. Furthermore, the selection of an address range for the direct access address space is arbitrary and may be located anywhere in the addressable range, as desired.

In response to the direct access signal, control circuit 36 ignores the hit signals from comparators 34A–34D. The direct access transaction is treated as a cache hit. The entry to be accessed (read or written) is explicitly identified by the direct access transaction. For example, in the present embodiment, address bits other than those used to identify the direct access address space are used to supply the index and way of the entry. More particularly, in the illustrated embodiment, the same address bits used to index the cache in memory transactions are used to supply the index in a direct access transaction. In this manner, additional hardware to provide the index to tags memory 30 and data memory 32 for direct access transactions may be avoided. The way is supplied in other address bits (e.g. more significant address bits than the index). In the illustrated embodiment, the more significant address bits contiguous to the index bits are used to convey the way selection (e.g. address bits 18:17 provided to control circuit 36). Control circuit 36 provides the way selection indicated by the direct access transaction as the way selection to tags memory 30 and data memory 32.

It is noted that, while direct access transactions are illustrated as providing the index and way in the address in the present embodiment, other embodiments are contemplated. For example, the index and way may be provided on control signals separate from the address. Alternatively, each entry in L2 cache 14 may be assigned an entry number, and the entry number may be communicated by direct access transactions (e.g. as part of the address or on control signals). Still further, direct mapped implementations may use only an index (or entry number) and fully associative embodiments may use only a way (or entry number). Any method for explicitly communicating the selected entry may be used in various implementations of a direct access transaction.

Since the hit signals from comparators 34A–34D are ignored by control circuit 36 for direct access transactions, the tag of the selected entry need not match the tag portion of the input address for direct access transactions. If the direct access transaction is a read, the data in the selected entry is provided regardless of any tag match or mismatch. If the direct access transaction is a write, the data provided in the direct access transaction is written to the selected entry, overwriting the data currently stored in the entry. For direct access write transactions, control circuit 36 may update the tag in the selected entry with the tag portion of the input address. In this manner, if the entry was previously storing valid memory transaction data, the entry will be a miss for memory transactions affecting that memory transaction data. Additionally, bits in the tag portion of the address may be used to specify the desired state of the valid and dirty bits in the tag. These bits may be written to the valid and dirty bits in the tag of the specified entry. Additionally, since the direct access transactions are treated as cache hits, there may be no eviction of a cache line in response to direct access transactions.

Control circuit 36 may assert the hit signal to memory controller 16 in response to direct access transactions, if desired. Alternatively, since the illustrated embodiment employs a separate address space for memory transactions and direct access transactions, memory controller 16 may ignore direct access transactions on bus 24.

Decoder 40 is provided to detect a write to way enable register 42. Way enable register 42 may be assigned an address within a configuration address space, for example. More particularly, in one embodiment, way enable register 42 may be assigned an address range. The most significant address bits which define the range may be decoded by decoder 40 (e.g. bits 39:12 in the illustrated embodiment) to provide a write enable to way enable register 42. The remaining address bits (e.g. bits 11:8 in the illustrated embodiment) may be used to provide the value to store into way enable register 42. For example, the illustrated embodiment uses a bit for each way. The bit may be set to indicate that the way is enabled and clear to indicate that the way is disabled (or vice versa). In this manner, any number of ways may be enabled or disabled and the ways may be individually enabled and disabled. Thus, a large degree of flexibility in the enabling and disabling of ways may be provided. More particularly, if all the bits are set, then all ways are enabled. Other encodings disable various ways. While the above description detects a write to way enable register 42 via the address and draws the value to be written from the address, other embodiments are possible. For example, the data may be provided as data in the write transaction, on separate control signals from the address, etc. Any suitable manner for communicating a value to way enable register 42 may be used.

It is noted that the embodiment illustrated in FIG. 2 shows various exemplary address bit ranges for a particular implementation of the L2 cache (e.g. 4 way set associative, 512 kilobytes, with 32 byte cache lines) and the size of the addresses provided on bus 24. Other embodiments may vary any of these features and the bit ranges may be updated accordingly. For example, if more ways are provided, the bit range providing the way for direct access transactions may be increased. If the size of the cache is increased and the number of ways remains the same, the index bit range may be expanded (and the tag range reduced). Also, the bit range for the way selection may be moved to accommodate the larger index. The size of the address (40 bits in the illustrated embodiment) may be varied, affecting the bit ranges appropriately as well. Furthermore, the bit ranges may be selected differently in different implementations, according to design choice.

It is noted that, while tags memory 30 and data memory 32 are illustrated separately in FIG. 2, these memories may be integrated if desired. Generally, tags memory 30 and data memory 32 may form a memory for storing tags and corresponding cache lines of data, whether the memory is divided into portions as illustrated or is a single integrated memory.

It is noted that, while the embodiment illustrated in FIG. 2 detects direct access transactions via an address space, other embodiments may detect direct access transactions in other ways. For example, an alternative embodiment may employ different encodings on the control signals of bus 24 to identify memory transactions and direct access transactions, if desired.

It is noted that FIG. 2 illustrates address, data, and control signals being supplied to the L2 cache circuitry. L2 cache 14 may include buffers or queues (not shown) to capture address and data portions of transactions. The supplied address, data, and control signals may correspond to the transaction at the head of the buffers or queues.

As used herein, the term "register" refers to any clocked storage device. For example, a register may be a flip-flop (or "flop"), a latch, a series of latches, a clocked random access memory (RAM) cell, or any other desirable storage.

Figure 3:
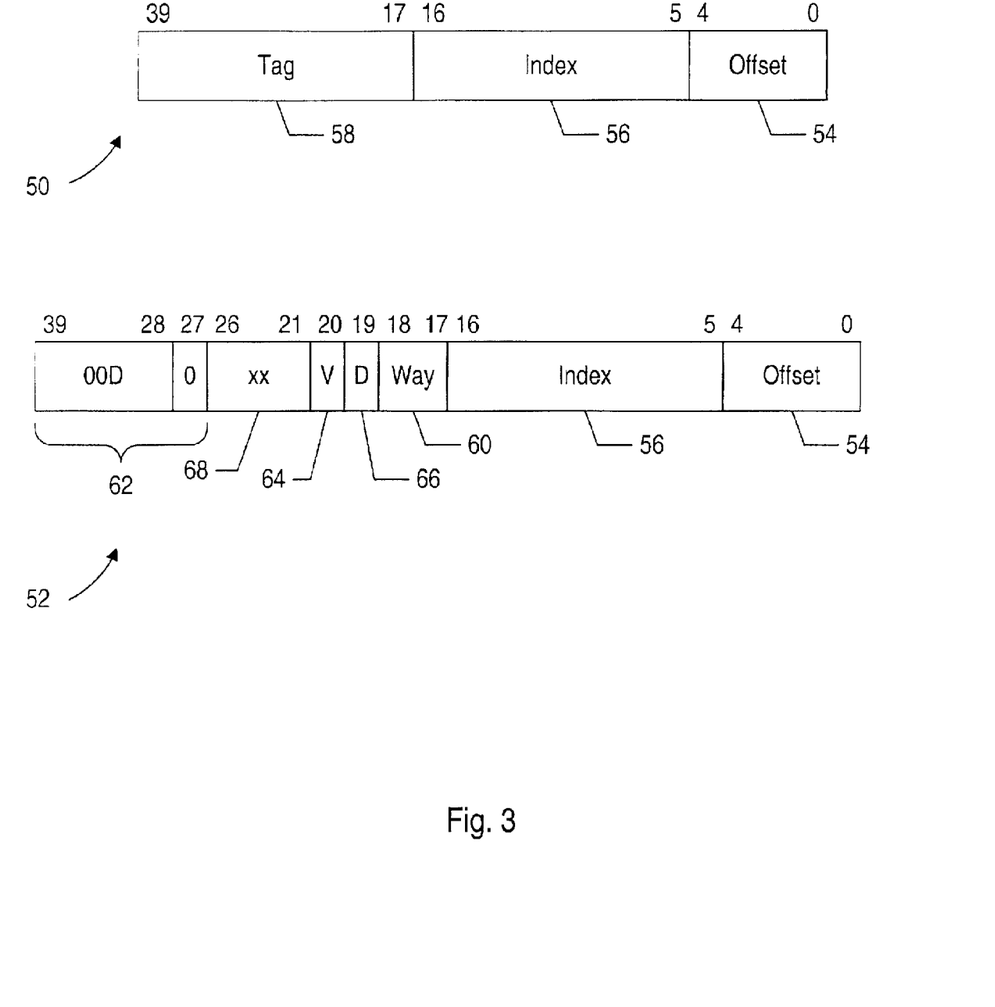
FIG. 3 is a block diagram illustrating an exemplary memory address and an exemplary direct access address.

Turning now to FIG. 3, a block diagram illustrating an exemplary memory transaction address 50 and an exemplary direct access transaction address 52 is shown. The addresses illustrated in FIG. 3 may correspond to the embodiment illustrated in FIG. 2.

Memory transaction address 50 includes an offset field 54, an index field 56, and a tag field 58. Offset field 54 includes the bits defining the offset within a cache line. Index field 56 includes the bits used to index L2 cache 14 (e.g. bits 16:5 in the embodiment illustrated in FIG. 2). Tag field 58 includes the remaining bits of the address not included in offset field 54 and index field 56. Tag field 58 includes the address bits stored in tag memory 30 and compared to the corresponding portion of the input address.

Direct access transaction address 52 includes offset field 54 and index field 56, similar to memory transaction address 50. Additionally, direct access transaction address 52 includes a way field 60 identifying the way to be accessed in response to the direct access transaction (e.g. bits 18:17 in the embodiment illustrated in FIG. 2). A field 62 including a set of most significant bits of direct access transaction address 52 are encoded to select the direct access memory address space (e.g. bits 39:27 in the embodiment illustrated in FIG. 2). Any encoding may be used to identify the direct access address space according to design choice. Direct access transaction address 52 further includes a valid bit 64 and a dirty bit 66. These bits may be written to the valid and dirty bits of the selected tag entry if a tag update is performed (e.g. in response to a direct access write transaction, in one embodiment). Additionally, since way field 60, valid bit 64 and dirty bit 66 are part of the tag portion of the address in the illustrated embodiment, these bits are written to the corresponding tag bits in the selected tag entry as well. The remaining bits of the direct transaction address 52 (field 68) may be done cares in the present embodiment. However, the value provided in filed 68 may be written to the tag of the entry if the direct access transaction is a write.

It is noted that the bits comprising offset field 54 may not actually be transmitted on one embodiment of bus 24. Instead, byte enables may be transmitted indicating which bytes are accessed by the transaction. The byte enable for the byte identified by offset field 54 is set, and additional byte enables based on the size of the transaction may be set.

Figure 4:
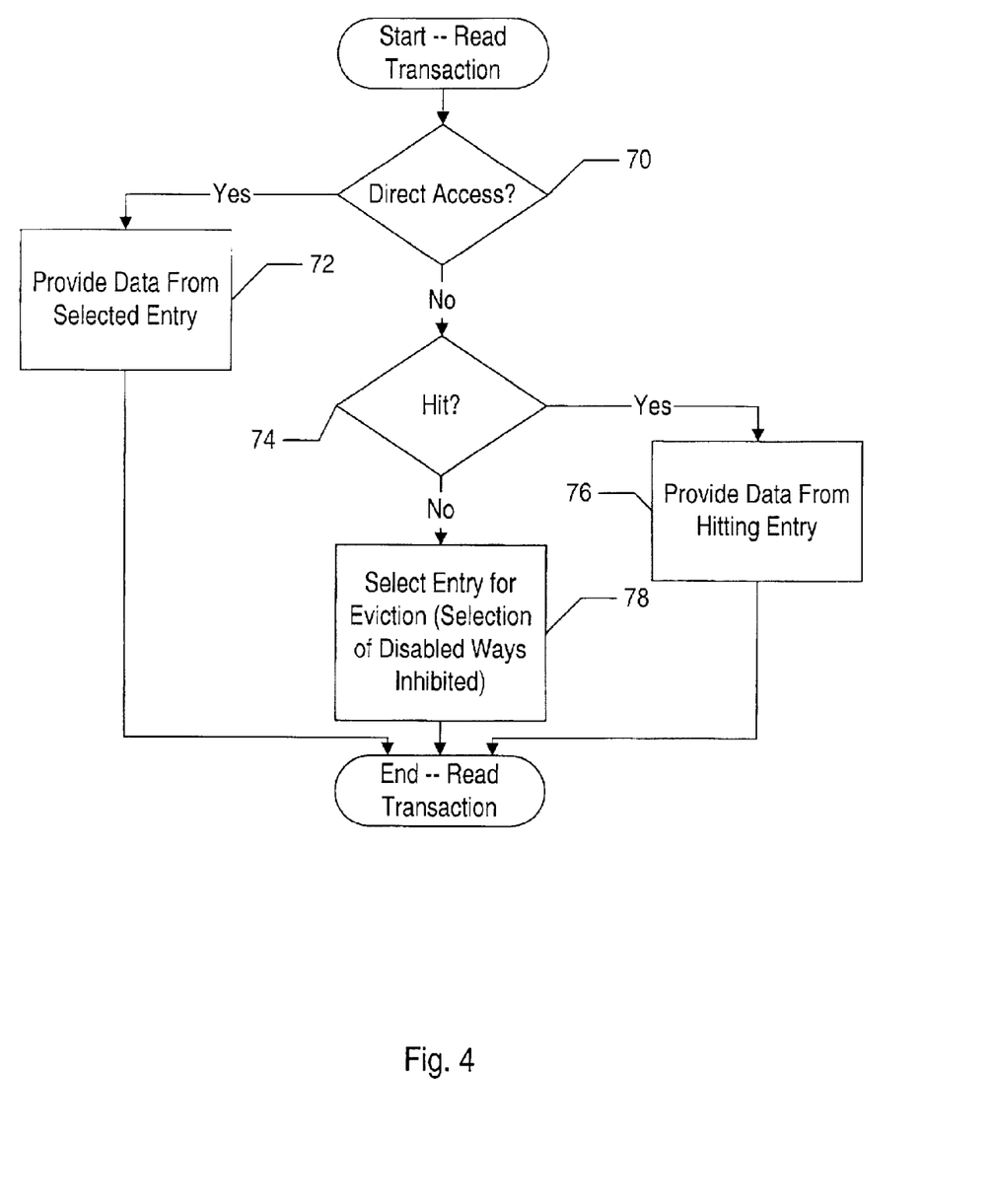
FIG. 4 is a flowchart illustrating a read transaction in one embodiment of the cache shown in FIGS. 1 and 2.

Turning now to FIG. 4, a flowchart illustrating operation of one embodiment of L2 cache 14 (and more particularly control circuit 36, in the embodiment of FIG. 2) for a read transaction is shown. Other embodiments are possible and contemplated. While the blocks shown in FIG. 4 may be illustrated in a particular order for ease of understanding, the blocks may be performed in parallel by combinatorial logic circuitry within L2 cache 14. Furthermore, various blocks may be performed in different clock cycles (e.g. the operation may be pipelined) according to design choice.

If the read transaction is a direct access transaction (decision block 70), L2 cache 14 provides the data from the selected entry in response to the read transaction (block 72). The selected entry is identified by the explicit index and way provided by the direct access transaction. Whether or not the tag portion of the address in the selected entry matches the address of the read transaction does not affect the forwarding of data, and no cache eviction may occur.

If the read transaction is a memory transaction ("no" leg of decision block 70), L2 cache 14 determines if the address hits (decision block 74). If the address hits, the data from the hitting entry is provided in response to the read transaction (block 76). If the read transaction is a miss, L2 cache 14 selects an entry for eviction of the cache line stored therein, to be replaced by the cache line accessed by the read transaction (block 78). Entries in disabled ways are inhibited from being selected.

Figure 5:
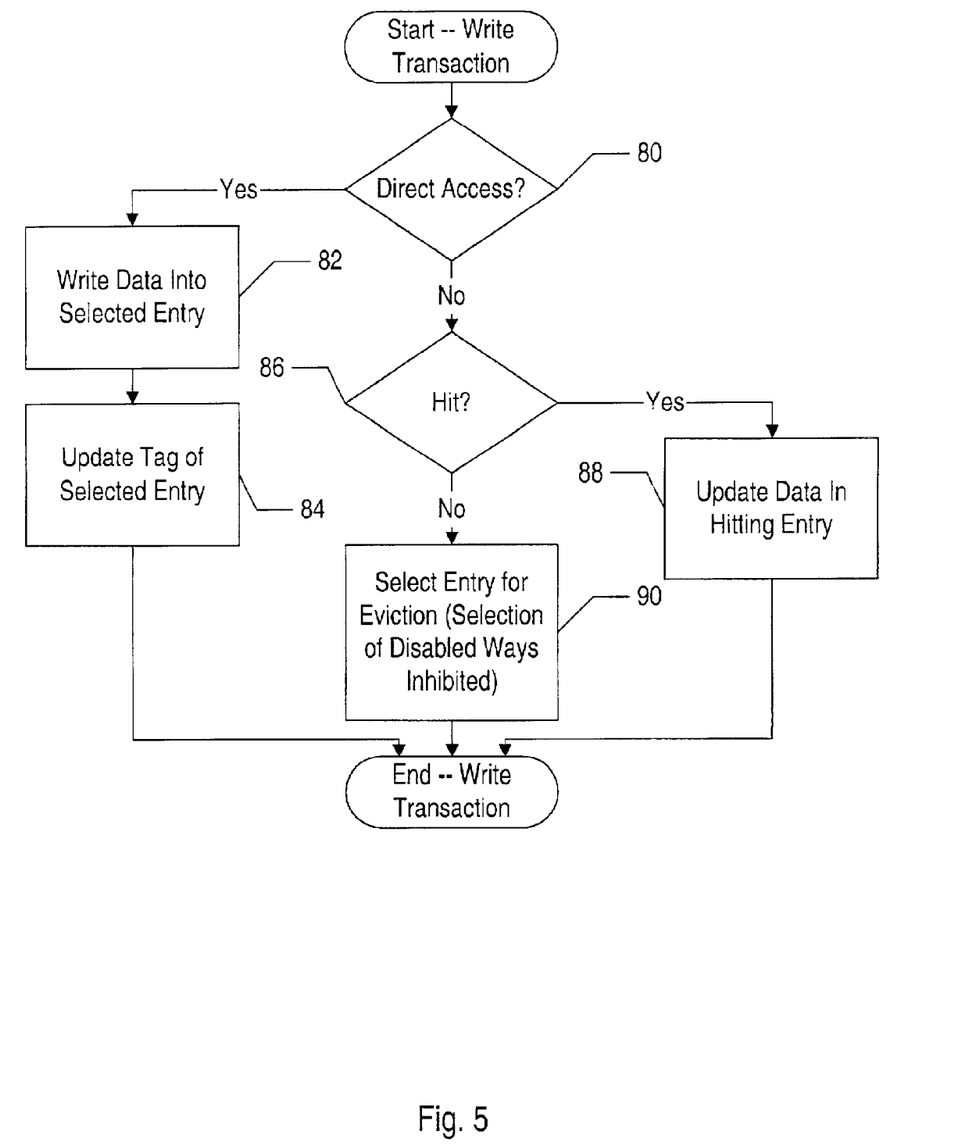
FIG. 5 is a flowchart illustrating a write transaction in one embodiment of the cache shown in FIGS. 1 and 2.

Turning now to FIG. 5, a flowchart illustrating operation of one embodiment of L2 cache 14 (and more particularly control circuit 36, in the embodiment of FIG. 2) for a write transaction is shown. Other embodiments are possible and contemplated. While the blocks shown in FIG. 6 may be illustrated in a particular order for ease of understanding, the blocks may be performed in parallel by combinatorial logic circuitry within 2 cache 14. Furthermore, various blocks may be performed in different clock cycles (e.g. the operation may be pipelined) according to design choice.

If the write transaction is a direct access transaction (decision block 80), L2 cache 14 stores the data included in the write transaction into the selected entry (block 82). The selected entry is identified by the explicit index and way provided by the direct access transaction. Whether or not the tag portion of the address in the selected entry matches the address of the write transaction does not affect the updating of the selected entry. Furthermore, if valid data is stored in the entry, that data is overwritten (even if the tag does not match the address of the write transaction). Additionally, the tag of the selected entry may be updated with the corresponding portion of the address of the write transaction (block 84). In this manner, the entry may not be affected by coherency activity in the memory address space.

If the write transaction is a memory transaction ("no" leg of decision block 80), L2 cache 14 determines if the address hits (decision block 86). If the address hits, the data included in the write transaction is written to the hitting entry (block 88). If the write transaction is a miss, L2 cache 14 selects an entry for eviction of the cache line stored therein, to be replaced by the cache line accessed by the write transaction (block 90). Entries in disabled ways are inhibited from being selected.

While the embodiment illustrated via FIG. 5 allocates an entry for write memory transactions which miss L2 cache 14, other embodiments may not allocate an entry for write misses or may provide for programmability of write allocation, as desired. Additionally, the embodiment illustrated via FIGS. 4 and 5 assumes that the transaction is cacheable in L2 cache 14. Some embodiments may provide for indicating the cacheability of each transaction. If a transaction is indicated to be non-cacheable, L2 cache 14 may not respond to the transaction.

Figure 6:
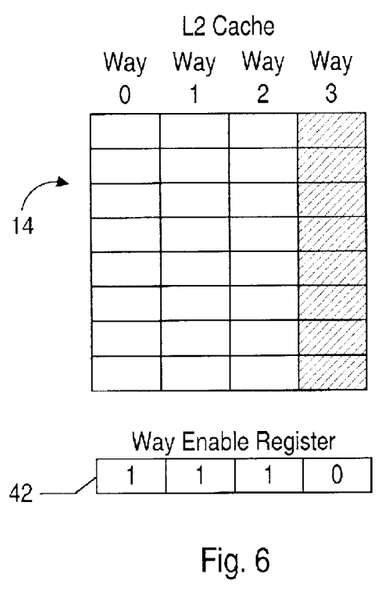
FIG. 6 is a first example of disabling of one or more cache entries for use as a scratch pad according to one embodiment of the cache shown in FIGS. 1 and 2.
Figure 7:
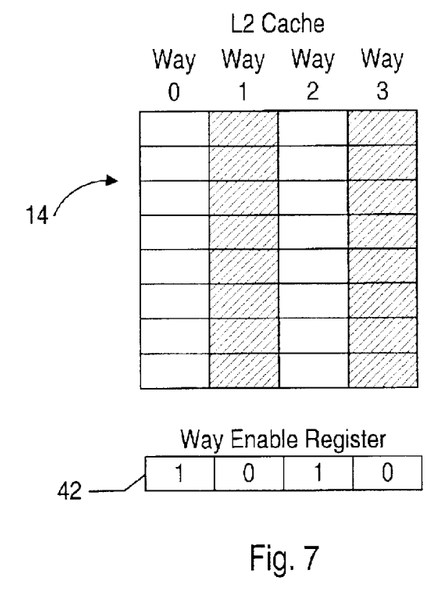
FIG. 7 is a second example of disabling of one or more cache entries for use as a scratch pad according to one embodiment of the cache shown in FIGS. 1 and 2.
Figure 8:
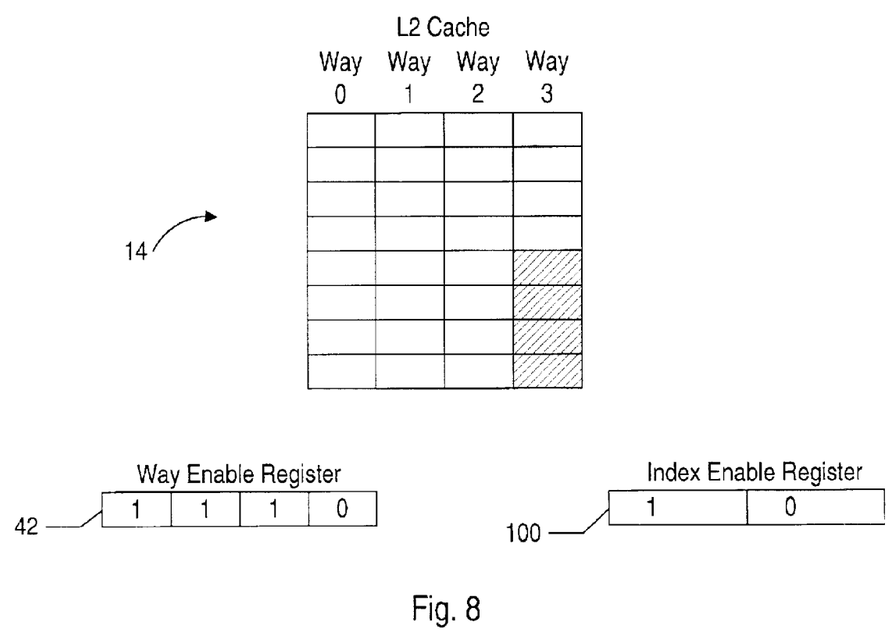
FIG. 8 is a third example of disabling of one or more cache entries for use as a scratch pad according to one embodiment of the cache shown in FIGS. 1 and 2.

FIGS. 6, 7, and 8 are examples of disabling various portions of L2 cache 14 (e.g. for use as a scratch pad). In each example, the crosshatched portions of the L2 cache are disabled. The non-crosshatched portions are enabled and are used to cache memory transaction data. Additionally, the value stored in way enable register 42 is illustrated in each of FIGS. 6, 7, and 8. FIG. 8 illustrates an example in which additional programmability is provided via an index enable register 100, as described in more detail below.

In FIG. 6, way 3 of L2 cache 14 is disabled. Ways 0, 1, and 2 are available for allocation to store memory transaction data. Way enable register 42 as illustrated in FIG. 6 stores a value indicating that ways 0, 1, and 2 are enabled and that way 3 is disabled. More particularly, way enable register 42 may include a bit for each way. Way enable register 42 as illustrated in FIG. 6 thus stores bits which are set for each of ways 0, 1, and 2 (indicating the corresponding ways are enabled) and a bit which is clear for way 3 (indicating that way 3 is disabled). The sense of the bits may be reversed (i.e. clear may indicate enabled and set may indicate disabled).

In FIG. 7, ways 1 and 3 of L2 cache 14 are disabled. Ways 0 and 2 are available for allocation to store memory transaction data. Thus, way enable register 42 includes bits which are set corresponding to ways 0 and 2 and bits which are clear corresponding to ways 1 and 3. As FIG. 7 illustrates, the ways which are disabled need not be contiguous ways. Any set of ways may be disabled while other ways are enabled, as desired.

FIG. 8 illustrates additional programmability for disabling entries using index enable register 100. Index enable register 100 may store an indication of which indexes are disabled for allocation to store memory transaction data. By using index register 100 in conjunction with way enable register 42, L2 cache 14 may be configurable to disable less than a complete way. If the scratch pad memory needed is less than a full way of L2 cache 14, an embodiment including index enable register 100 may provide increased performance while still providing the scratch pad memory.

More particularly, the disabled entries may be the entries within a disabled way, as indicated by way enable register 42 and at a disabled index, as indicated by index enable register 100. In the example, the upper half of the indexes are controlled by one bit of index enable registers 100 and the lower half of the indexes are controlled by the other bit. Thus, the upper half of the indexes are enabled, and the lower half of the indexes are disabled. Additionally, in the example, way 3 is disabled. Thus, the entries within the lower half of the indexes within way 3 are disabled and may be used as scratch pad. All indexes of ways 0, 1, and 2 are enabled and the upper half of the indexes of way 3 are enabled for storing memory transaction data. In other embodiments, the index disable may be more granular (e.g. there may be more bits in index enable registers 100 corresponding to more groups of indexes).

Index enable register 100 may be included in an embodiment of L2 cache 14 similar to the embodiment shown in FIG. 2. Index enable register 100 may be programmable in a fashion similar to the programming of way enable register 42. Alternatively, way enable register 42 and index enable register 100 may be the same register, with fields defined corresponding to the way enable value and the index enable value. Still further, index register 100 may be employed instead of way enable register 42. In yet another alternative, entries may be assigned entry numbers and registers may store an indication of the first and last entries of a range of disabled entries, if desired.

Figure 9:
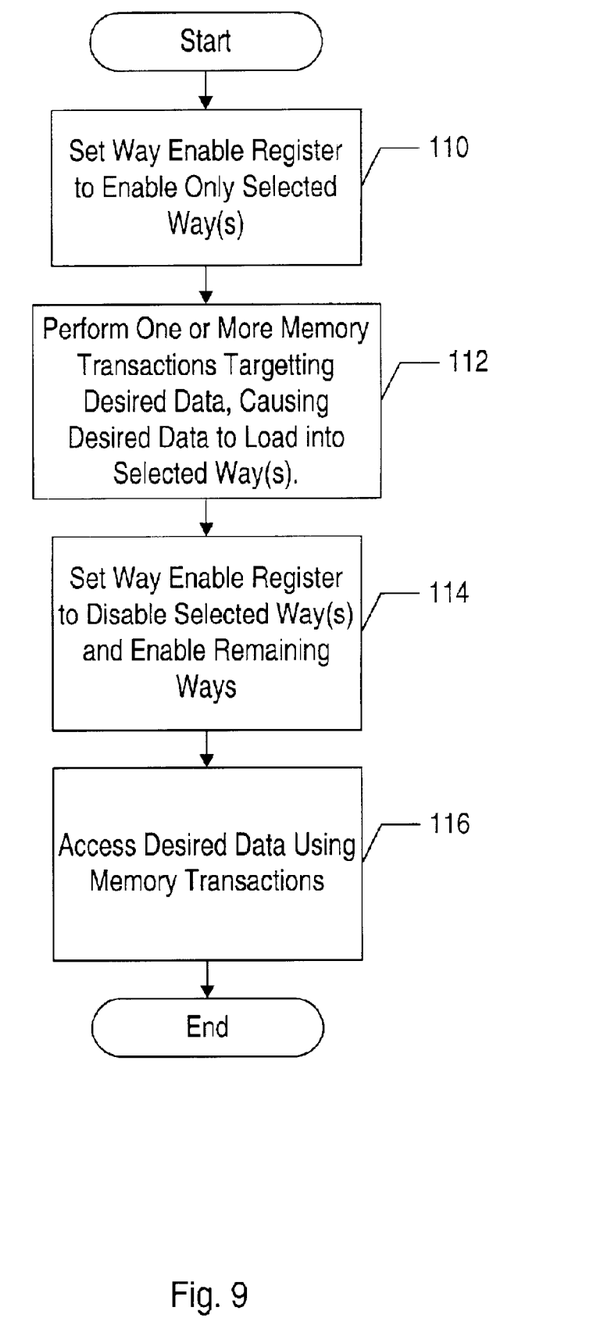
FIG. 9 is a flowchart illustrating one embodiment of use of disabled entries in L2 cache 14 to lock desired memory data into the disabled entries.

Turning next to FIG. 9, a flowchart is shown illustrating one embodiment of use of disabled entries in L2 cache 14 to lock desired memory data into the disabled entries. Other embodiments are possible and contemplated.

A write to way enable register 42 is performed to enable the ways to be used to lock the data into the cache (referred to as the "selected ways") and to disable the remaining ways (referred to as the "remaining ways"—block 110). There may be one or more selected ways, and one or more remaining ways.

One or more memory transactions are performed (block 112). Each memory transaction targets data to be loaded into the selected ways. Since the remaining ways are disabled, an entry in one of the selected ways is allocated to store the data corresponding to each memory transaction (assuming the memory transactions miss L2 cache 14). Either read or write transactions may be performed, as desired. Generally, data may be loaded into each entry of each selected way, or into a number of entries as may be desired.

Another write to way enable register 42 is performed to disable the selected ways and enable the remaining ways (block 114). Thus, the data loaded into the selected ways may be locked into the selected ways by disabling allocation of entries within the selected ways for subsequent cache misses. The remaining ways may be allocated for subsequent cache misses, since they are enabled. The data in the selected ways may be accessed by performing additional memory transactions to the addresses corresponding to the data (block 116). These additional memory transactions may hit in entries within the disabled ways, and the data may be provided from (for a read) or updated into (for a write) the hitting entries.

While the above discussion uses selected ways and remaining ways, other embodiments may use any other groupings of entries supported by the programmable disabling function. For example, embodiments employing index register 100, a combination of index register 100 and way enable register 42, or other methods for indicating the disabled entries may be used.

Figure 10:
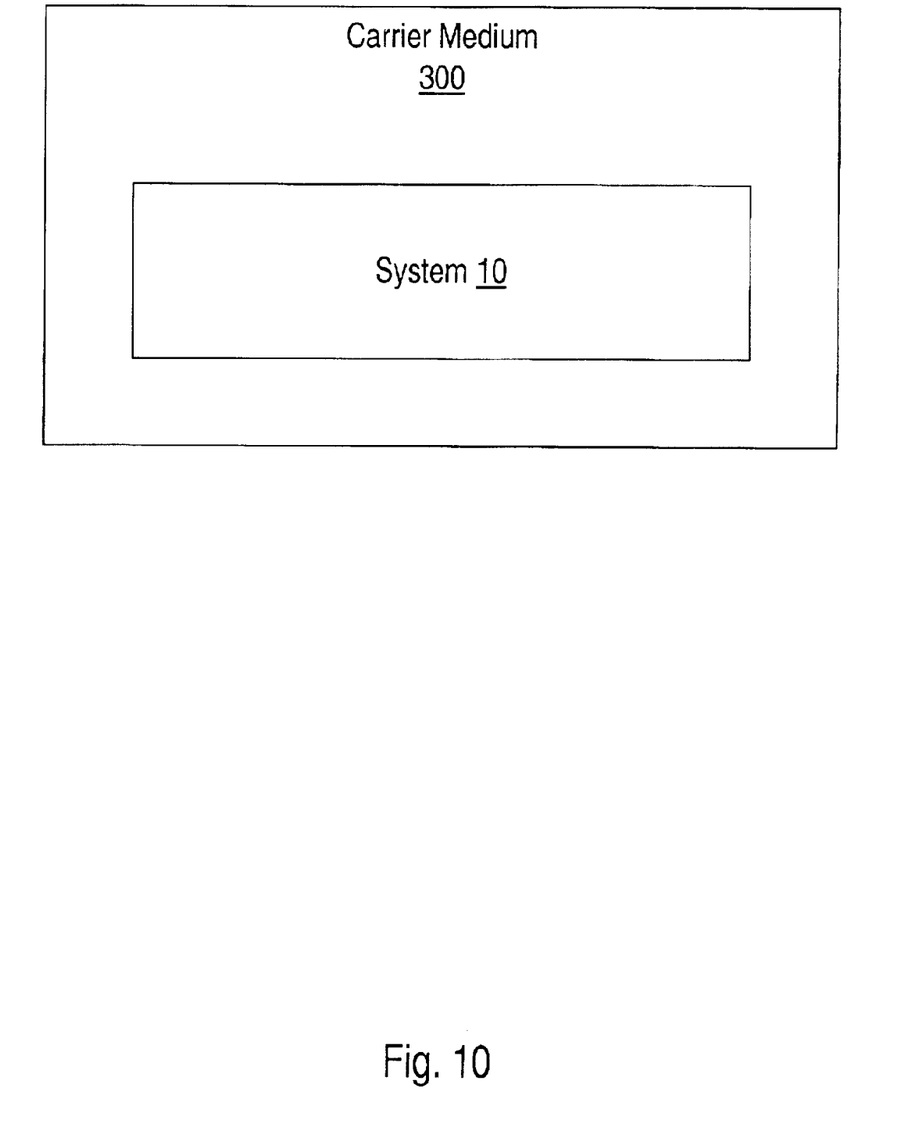
FIG. 10 is a block diagram of one embodiment of a carrier medium including the system shown in FIG. 1.

Turning next to FIG. 10, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL.

The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including one or more of L2 cache 14, memory controller 16, portions of L2 cache 14 (e.g. way enable register 42, index enable register 100, decoder 40, control circuit 36, and/or other elements illustrated in FIG. 2), etc.

Numerous variations and modifications will become apparent to those skilled in the art once the above disclosure is fully appreciated. It is intended that the following claims be interpreted to embrace all such variations and modifications.

What is claimed is:

1. A cache comprising:
    a memory having a plurality of entries, each of the plurality of entries capable of storing a cache line of data;
    one or more registers programmable to indicate which of the plurality of entries are enabled and which of the plurality of entries are disabled; and
    a control circuit configured to allocate enabled entries from the plurality of entries to cache data for memory transactions pursuant to a cache hit and miss protocol of a cache allocation scheme so that a cache miss to result in a selection of an enabled entry for eviction from the memory, the control circuit configured to allocate disabled entries from the plurality of entries to not evict a cache line from the disabled entries when the cache miss occurs, but to allow access to the disabled entries when a cache hit occurs or when direct access transactions are to be performed.

2. The cache as recited in claim 1 wherein the plurality of entries are arranged in a set associative structure having a plurality of ways, each of the plurality of entries belonging to one of the plurality of ways, and wherein the one or more registers are programmable to indicate that one or more of the plurality of ways are disabled from allocation and a remaining one or more of the plurality of ways are enabled for allocation.

3. The cache as recited in claim 2 wherein the one or more registers are programmable to indicate that each of the plurality of ways is enabled for allocation.

4. The cache as recited in claim 2 wherein the one or more registers are programmable to indicate which indexes within the remaining one or more ways are enabled for allocation.

5. The cache as recited in claim 1 further comprising a decoder coupled to receive addresses of the memory transactions, and wherein a range addressable via the addresses includes a first address space mapped to the one or more registers, and wherein a value stored in the one or more registers comprises one or more bits of addresses within the first address space, and wherein the decoder is configured to decode addresses within the first address space and to cause the one or more registers to update with the value.

6. The cache as recited in claim 1 wherein the control circuit is configured to permit access to a first entry of the plurality of entries that are disabled responsive to a first direct access transaction specifying the first entry.

7. The cache as recited in claim 6 wherein a range addressable via addresses on an interconnect to which the cache is coupled includes a memory address space mapped to a memory controller and a direct access address space used for direct access transactions, and wherein the memory transactions have addresses within the memory address space.

8. The cache as recited in claim 7 wherein the plurality of entries are arranged in a set associative structure, and wherein a first address of the first direct access transaction includes an index portion and a way selection portion.

9. The cache as recited in claim 8 wherein the way selection portion is located in more significant bits of the first address than the index portion is located.

10. The cache as recited in claim 9 wherein the more significant bits in which the way selection portion is located are contiguous to bits in which the index portion is located.

11. The cache as recited in claim 7 further comprising a decoder coupled to the control circuit, wherein the decoder is configured to decode the addresses of the memory transactions and the direct access transactions, and wherein the decoder is configured to signal the control circuit if an address within the direct access address space is decoded.

12. The cache as recited in claim 6 wherein each of the plurality of entries further includes a tag identifying an address corresponding to the cache line of data, and wherein the first direct access transaction comprises a read transaction, and wherein the cache is configured to return data from the first entry without regard to a comparison between the tag and a corresponding portion of a first address provided in the first direct access transaction.

13. The cache as recited in claim 6 wherein each of the plurality of entries further includes a tag identifying an address corresponding to the cache line of data, and wherein the first direct access transaction comprises a write transaction, and wherein the cache is configured to store data from the first direct access transaction into the first entry without regard to a comparison between the tag and a corresponding portion of a first address provided in the first direct access transaction.

14. The cache as recited in claim 13 wherein the control circuit is further configured to cause an update of the tag in the first entry in response to the first direct access transaction.

15. The cache as recited in claim 1 wherein, in response to a write memory transaction hitting in a first entry of the plurality of entries that is disabled, the control circuit is configured to cause the first entry to be updated with data corresponding to the write memory transaction.

16. A system comprising:
    a processor configured to initiate transactions;
    a memory controller coupled to receive the transactions and capable of being coupled to a memory; and
    a cache coupled to receive the transactions, the cache including a plurality of entries, each of the plurality of entries capable of storing a cache line of data, wherein the cache comprises one or more registers programmable to indicate which of the plurality of entries are enabled to cache data pursuant to a cache hit and miss protocol of a cache allocation scheme, so that a cache miss to result in a selection of an enabled entry for eviction from the cache, and which of the plurality of entries are disabled from the cache allocation scheme to not evict a cache line from the disabled entries when the cache miss occurs, but to allow access to the disabled entries when a cache hit occurs or when direct access transactions are to be performed.

17. The system as recited in claim 16 wherein the cache is set associative, and wherein the entries of the plurality of entries that are disabled comprise one or more ways of the cache, and wherein the entries of the plurality of entries that are enabled comprise remaining ways of the cache.

18. The system as recited in claim 17 wherein the one or more registers are further programmable to indicate which indexes within the one or more ways are disabled from allocation.

19. The system as recited in claim 16 further comprising a decoder coupled to receive addresses of the transactions, and wherein a range addressable via the addresses includes a first address space mapped to the one or more registers, and wherein a value to be stored in the one or more registers comprises one or more bits of addresses within the first address space, and wherein the decoder is configured to decode addresses within the first address space and to cause the one or more registers to update with the value.

20. The system as recited in claim 16 wherein the cache is configured to permit access to a first entry of plurality of entries that are disabled responsive to a first direct access transaction of the transactions, the first direct access transaction explicitly targeting the first entry, and wherein the first direct access transaction does not target a location within the memory.

21. The system as recited in claim 20 wherein an address of the first direct access transaction is outside of a memory address space corresponding to the memory.

22. The system as recited in claim 21 wherein the cache is set associative, and wherein the address includes an index portion and a way selection portion.

23. The system as recited in claim 22 wherein the way selection portion includes more significant bits of the address than the index portion includes.

24. The system as recited in claim 20 wherein each of the plurality of entries further includes a tag identifying an address corresponding to the cache line of data, and wherein the first direct access transaction comprises a read transaction, and wherein the cache is configured to return data from the first entry without regard to a comparison between the tag and a corresponding portion of a first address provided in the first direct access transaction.

25. The system as recited in claim 20 wherein each of the plurality of entries further includes a tag identifying an address corresponding to the cache line of data, and wherein the first direct access transaction comprises a write transaction, and wherein the cache is configured to store data from the first direct access transaction into the first entry without regard to a comparison between the tag and a corresponding portion of a first address provided in the first direct access transaction.

26. The system as recited in claim 25 wherein the cache is further configured to update the tag in the first entry with a portion of the first address provided in the first direct access transaction.

27. The system as recited in claim 16 wherein, in response to a write memory transaction hitting in a first entry of the plurality of entries that is disabled, the cache is configured to cause the first entry to be updated with data corresponding to the write memory transaction.

28. A method comprising:
programming one or more registers in a cache to indicate which of a plurality of entries in the cache are enabled for allocation to cache data for memory transactions pursuant to a cache hit and miss protocol of a cache allocation scheme, so that a cache miss to result in a selection of an enabled entry for eviction from the cache, and which of the plurality of entries are disabled from the cache allocation scheme to not evict a cache line from the disabled entries when the cache miss occurs, but to allow access to the disabled entries when a cache hit occurs or when direct access transactions are to be performed, each of the plurality of entries capable of storing a cache line of data;

allocating a first entry of the plurality of entries that are enabled to cache data corresponding to a first memory transaction;

receiving a second memory transaction which hits in a second entry of the plurality of entries that is disabled; and allowing access to the second entry for the second memory transaction.

29. The method as recited in claim 28 wherein the cache is set associative, and wherein the plurality of entries that are enabled comprise one or more ways of the cache.

30. The method as recited in claim 29 wherein the programming one or more registers further comprises programming the one or more registers to indicate which indexes within the one or more ways are enabled for allocation.

31. The method as recited in claim 28 wherein the programming comprises:
decoding addresses within a first address space mapped to the one or more registers, and wherein a value to be stored in the one or more registers comprises one or more bits of addresses within the first address space; and causing the one or more registers to update with the value responsive to the decoding.

32. The method as recited in claim 28 further comprising performing direct access transactions to the plurality of entries that are disabled to use the one or more entries as a private memory, the direct access transactions explicitly targeting the plurality of entries that are disabled.

33. The method as recited in claim 32 wherein each of the direct access transactions includes an address within an address space separate from a memory address space corresponding to a memory targeted by the memory transactions.

34. The method as recited in claim 33 further comprising selecting a first entry of the plurality of entries that are disabled responsive to the address.

35. The method as recited in claim 34 wherein the cache is set associative, and wherein the address includes an index portion and a way selection portion, the method further comprising:
selecting an index of the cache responsive to the index portion of the address; and
selecting a way of the cache responsive to the way selection portion of the address.

36. The method as recited in claim 35 wherein the way selection portion comprises more significant bits of the address than the index portion comprises.

37. The method as recited in claim 32 further comprising:
receiving a first direct access read transaction in the cache; and
providing data from a second entry of the cache in response to the first direct access read transaction without regard to a tag comparison.

38. The method as recited in claim 32 further comprising:

receiving a first direct access write transaction in the cache; and storing data from the first direct access write transaction into a second entry of the cache in response to the first direct access write transaction without regard to a tag comparison.

39. The method as recited in claim 28 further comprising:

receiving a write memory transaction which hits in a second entry of the plurality of entries that is disabled; and causing the second entry to be updated with data corresponding to the write memory transaction.

40. A carrier medium comprising a database which is operated upon by a program executable on a computer system, the program operating on the database to perform a portion of a process to fabricate an integrated circuit including circuitry described by the database, the circuitry described in the database including a cache comprising:

a memory having a plurality of entries, each of the plurality of entries capable of storing a cache line of data;

one or more registers programmable to indicate which of the plurality of entries are enabled and which of the plurality of entries are disabled; and a control circuit configured to allocate enabled entries from the plurality of entries to cache data for memory transactions pursuant to a cache hit and miss protocol of a cache allocation scheme so that a cache miss to result in a selection of an enabled entry for eviction from the memory, the control circuit configured to allocate disabled entries from the plurality of entries to not evict a cache line from the disabled entries when the cache miss occurs, but allow access to the disabled entries when a cache hit occurs or when direct access transactions are to be performed.

41. The carrier medium as recited in claim 40 wherein the plurality of entries are arranged in a set associative structure having a plurality of ways, each of the plurality of entries belonging to one of the plurality of ways, and wherein the one or more registers are programmable to indicate that one or more of the plurality of ways are disabled from allocation and a remaining one or more of the plurality of ways are enabled for allocation.

42. The carrier medium as recited in claim 41 wherein the one or more registers are programmable to indicate that each of the plurality of ways is enabled for allocation.

43. The carrier medium as recited in claim 41 wherein the one or more registers are programmable to indicate which indexes within the remaining one or more ways are enabled for allocation.

44. The carrier medium as recited in claim 40 wherein the cache further comprises a decoder coupled to receive addresses of the memory transactions, and wherein a range addressable via the addresses includes a first address space mapped to the one or more registers, and wherein a value stored in the one or more registers comprises one or more bits of addresses within the first address space, and wherein the decoder is configured to decode addresses within the first address space and to cause the one or more registers to update with the value.

45. The carrier medium as recited in claim 40 wherein the control circuit is configured to permit access to a first entry of the plurality of entries that are disabled responsive to a first direct access transaction specifying the first entry.

46. The carrier medium as recited in claim 45 wherein a range addressable via addresses on an interconnect to which the cache is coupled includes a memory address space mapped to a memory controller and a direct access address space used for direct access transactions, and wherein the memory transactions have addresses within the memory address space.

47. The carrier medium as recited in claim 46 wherein the plurality of entries are arranged in a set associative structure, and wherein a first address of the first direct access transaction includes an index portion and a way selection portion.

48. The carrier medium as recited in claim 47 wherein the way selection portion is located in more significant bits of the first address than the index portion is located.

49. The carrier medium as recited in claim 48 wherein the more significant bits in which the way selection portion is located are contiguous to bits in which the index portion is located.

50. The carrier medium as recited in claim 46 wherein the cache further comprises a decoder coupled to the control circuit, wherein the decoder is configured to decode the addresses of the memory transactions and the direct access transactions, and wherein the decoder is configured to signal the control circuit if an address within the direct access address space is decoded.

51. The carrier medium as recited in claim 45 wherein each of the plurality of entries further includes a tag identifying an address corresponding to the cache line of data, and wherein the first direct access transaction comprises a read transaction, and wherein the cache is configured to return data from the first entry without regard to a comparison between the tag and a corresponding portion of a first address provided in the first direct access transaction.

52. The carrier medium as recited in claim 45 wherein each of the plurality of entries further includes a tag identifying an address corresponding to the cache line of data, and wherein the first direct access transaction comprises a write transaction, and wherein the cache is configured to store data from the first direct access transaction into the first entry without regard to a comparison between the tag and a corresponding portion of a first address provided in the first direct access transaction.

53. The carrier medium as recited in claim 52 wherein the control circuit is further configured to cause an update of the tag in the first entry in response to the first direct access transaction.

54. The carrier medium as recited in claim 40 wherein, in response to a write memory transaction hitting in a first entry of the plurality of entries that is disabled, the control circuit is configured to cause the first entry to be updated with data corresponding to the write memory transaction.

55. The carrier medium as recited in claim 40 wherein the circuitry described by the database further includes a processor configured to initiate transactions.

\* \* \* \* \*